(12) United States Patent
Kamata

(10) Patent No.: US 6,733,193 B2
(45) Date of Patent: May 11, 2004

(54) SHUTTER DEVICE FOR CAMERA

(75) Inventor: Kazuo Kamata, Minami-Ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/359,139

(22) Filed: Feb. 6, 2003

(65) Prior Publication Data

US 2003/0161625 A1 Aug. 28, 2003

(30) Foreign Application Priority Data

Feb. 28, 2002 (JP) ........................ 2002-054212

(51) Int. Cl.[7] .............................. G03B 9/26; G03B 9/20
(52) U.S. Cl. .................................. 396/494; 396/497
(58) Field of Search ............................ 396/494, 452, 396/471, 493, 497, 501, 475

(56) References Cited

U.S. PATENT DOCUMENTS 3,678,838 A * 7/1972 Huschle et al. ............. 396/454
5,017,954 A * 5/1991 Harvey ...................... 396/493

* cited by examiner

Primary Examiner—Russell Adams
Assistant Examiner—Rochelle Blackman
(74) Attorney, Agent, or Firm—Young & Thompson

(57) ABSTRACT

A shutter device has a front blade which is biased by a spring to a closed position for closing an exposure aperture, and a rear blade biased by a spring to an open position for opening the exposure aperture. A shutter drive lever kicks the front blade and the rear blade successively while moving to one direction. As soon as the front blade opens the exposure aperture, the rear blade closes the exposure aperture. And while the rear blade is biased by the spring to return to the initial position before opening the exposure aperture, the front blade is biased by the spring to close the exposure aperture. When the front blade and the rear blade return to the initial position by the urge of the spring, the two blades return with partly overlapped each other.

14 Claims, 6 Drawing Sheets

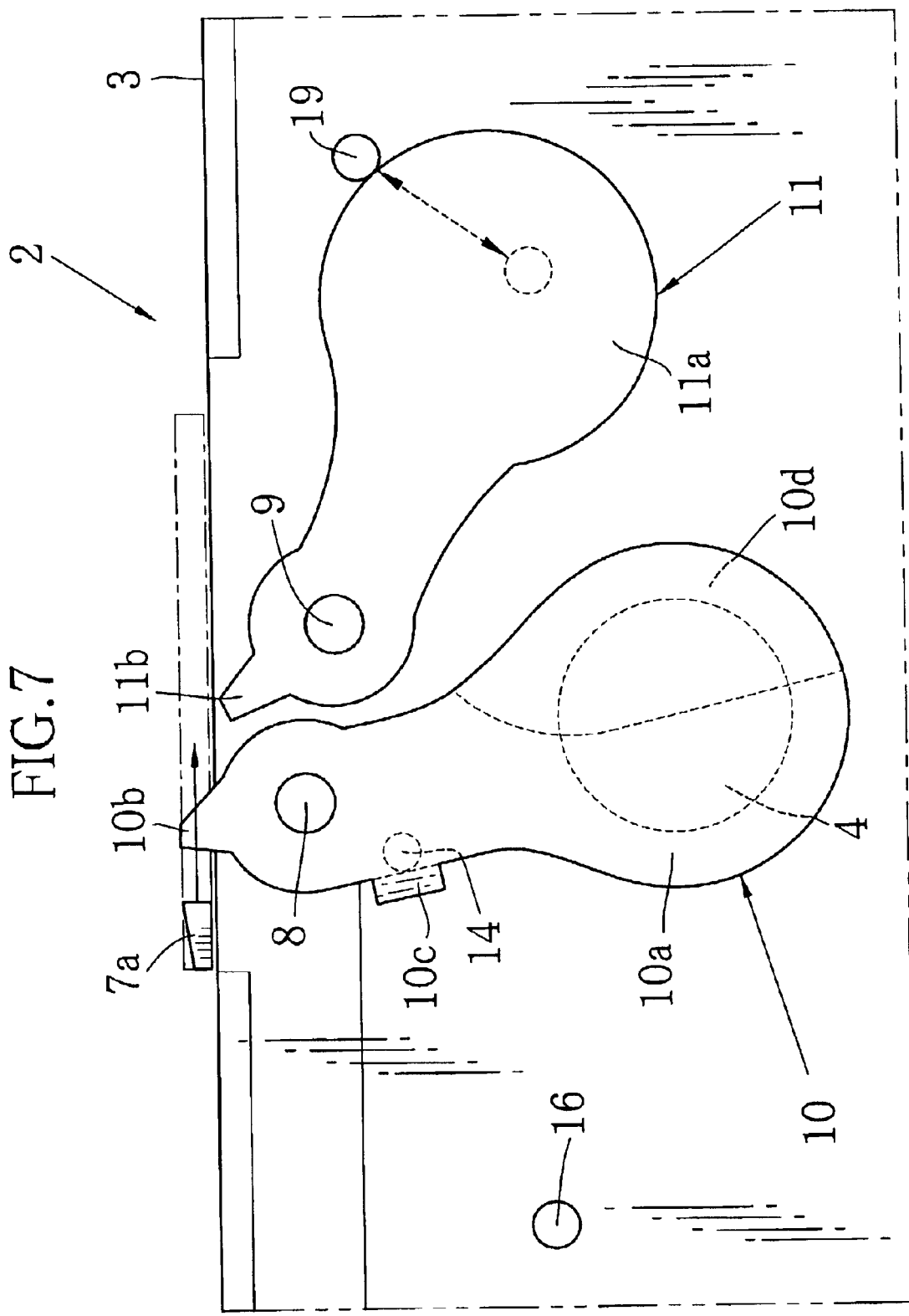

SHUTTER DEVICE FOR CAMERA

BACKGROUND OF THE INVENTION

1. Field of the Invention

The present invention relates to a strike-type shutter device that is suitable for a simple camera like a lens-fitted photo film unit, more particularly relates to a shutter device that realizes high shutter speed with a simple structure.

2. Explanations of the Prior Arts

A strike-type shutter device is used for a lens-fitted photo film unit or a simple camera. The shutter device consists of a shutter blade which is normally at a closed position for closing an exposure aperture by bias of a spring, and a shutter drive lever which moves from a charged position to a release position in cooperation with shutter release. The shutter drive lever strikes the shutter blade to open the exposure aperture for a fixed period while its moving from the charged position to the release position by a bias of a spring. Then, the shutter blade is returned to the closed position by the bias of the spring, so that an exposure to the photo film is completed.

According to the shutter device, due to the small number of necessary component parts, it is possible to keep manufacturing cost low. It is also possible to obtain single shutter speed stably within a range of $1/100 \sim 1/150$ seconds by choosing the coefficients of springs to urge the shutter drive lever and the shutter blade.

In case a high sensitivity photo film of ISO sensitivity 800 or 1600, however, photography under fine weather causes overexposure. As a countermeasure for over-exposure, it is proposed to use small diaphragm. Yet, keeping distance of flashlight reach unchanged upon flash photography loses special merits for using the high sensitivity photo film. As another countermeasure, it is proposed to shorten the shutter speed. For such a shutter which swings a single shutter blade for one exposure, however, the shutter speed of $1/150$ second or so was the limit to realize stable shutter speed.

SUMMARY OF THE INVENTION

An object of the present invention is to provide a shutter device for camera to realize a high shutter speed stably without changing the conventional method which strikes the shutter blade while moving the shutter drive lever in one direction.

Another object of the present invention is to provide a shutter device with high shutter speed at a low cost by keeping the number of component parts small.

To attain the above object and advantages, the shutter device of the present invention has a first blade held at a first position to close the exposure aperture by the bias of spring, and a second blade held at a second position to open the exposure aperture by the bias of spring. The shutter drive lever strikes the first blade and the second blade successively. The second blade begins to close the exposure aperture after the first blade opens the exposure aperture completely. After the exposure aperture is closed, the first blade and the second blade are overlapped with each other and rotate back to the primary positions with the exposure aperture closed. Owing to this, it is possible to realize a shutter device that can release a shutter stably and rapidly regardless of simple structure.

The rotation of the first blade is limited by a stopper. While the second blade is moving against the bias of the spring, the first blade is urged to return to the first position by the bias of the spring. The second blade overlaps with the first blade through the cutout formed in the first blade. The second blade strikes the first blade while closing the exposure aperture so as to limit its rotation.

The second blade is movable to a third position which is out of a moving range of the shutter drive lever. When the second blade is at the third position, the shutter drive lever strikes only the first blade, so that an exposure is carried out at a low shutter speed. Owing to this, it is possible to switch the shutter speed in two grades. When the second blade is at the second position, the shutter speed is determined in a range of $1/250$ to $1/500$ second. Meanwhile, the second blade is at the third position, the shutter speed is determined in a range of $1/100$ to $1/150$ second.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 7 is a schematic front view of another embodiment of the shutter device.

DETAILED DESCRIPTION OF THE EMBODIMENTS

Figure 1:
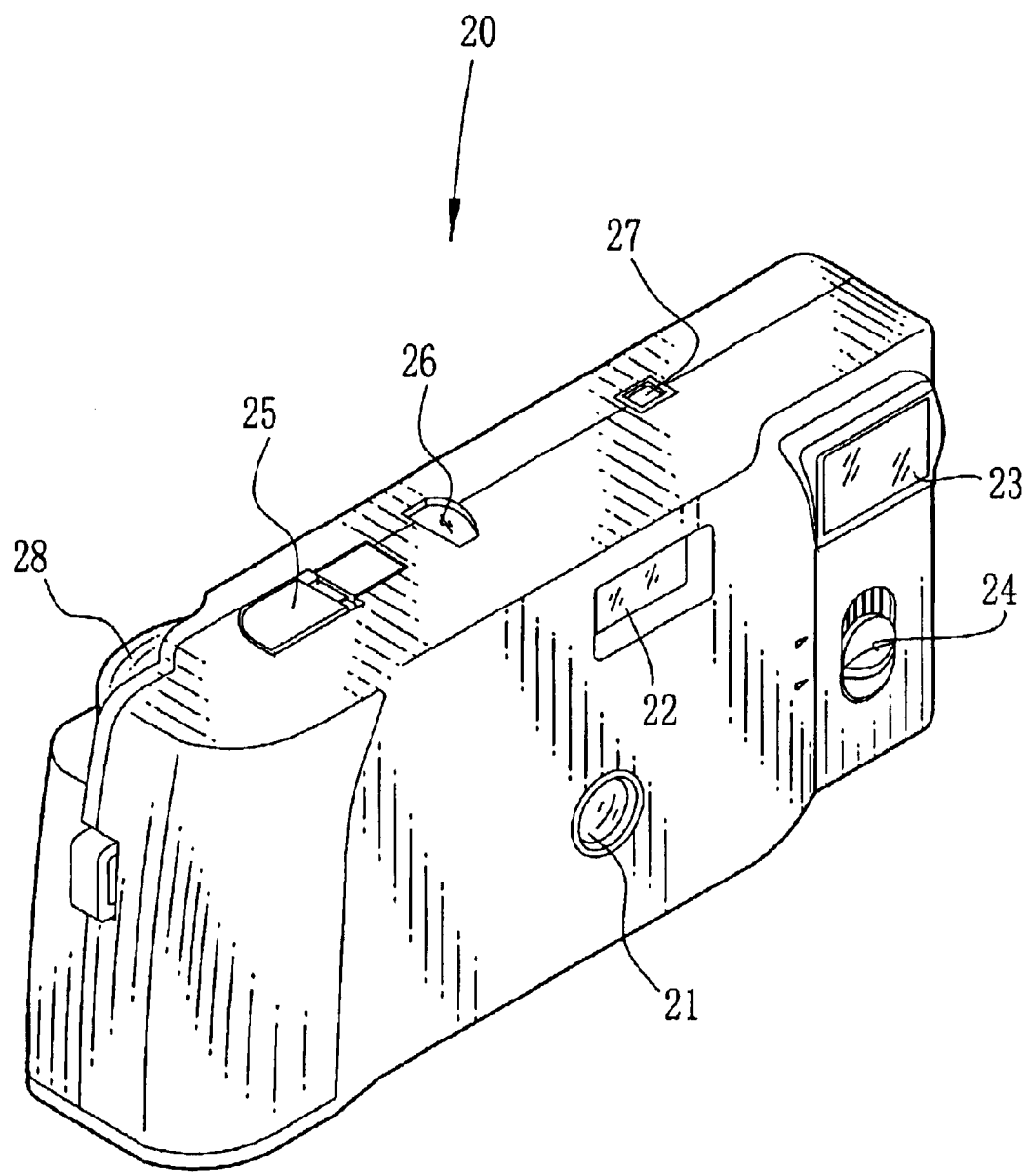
FIG. 1 is a perspective of a lens-fitted photo film unit with a shutter device of the present invention.

The embodiment of a lens-fitted photo film unit with a shutter device of the present invention is described in the following. As shown in FIG. 1, a lens-fitted photo film unit 20 is provided with a taking lens 21, a finder objective window 22, a flash emitter 23, and a flash operation member 24 on the front. A shutter button 25, a counter window 26 for displaying remaining frame number, and a charge completion display window 27 are provided on the top side of the lens-fitted photo film unit 20. A film winding wheel 28, and a finder eyepiece window (not shown) are disposed in the rear side of the lens-fitted photo film unit 20. The flash operation member 24, which is slidable up and down, is operated upon flash photography. Upon completion of flash charge, a light-emitting diode (LED) is lighted inside the lens-fitted photo film unit. A photographer can see the light from LED through the charge completion display window 27. When the shutter button 25 is pressed, flash light from the flash emitter 23 is emitted in synchronism with shutter release.

Figure 2:
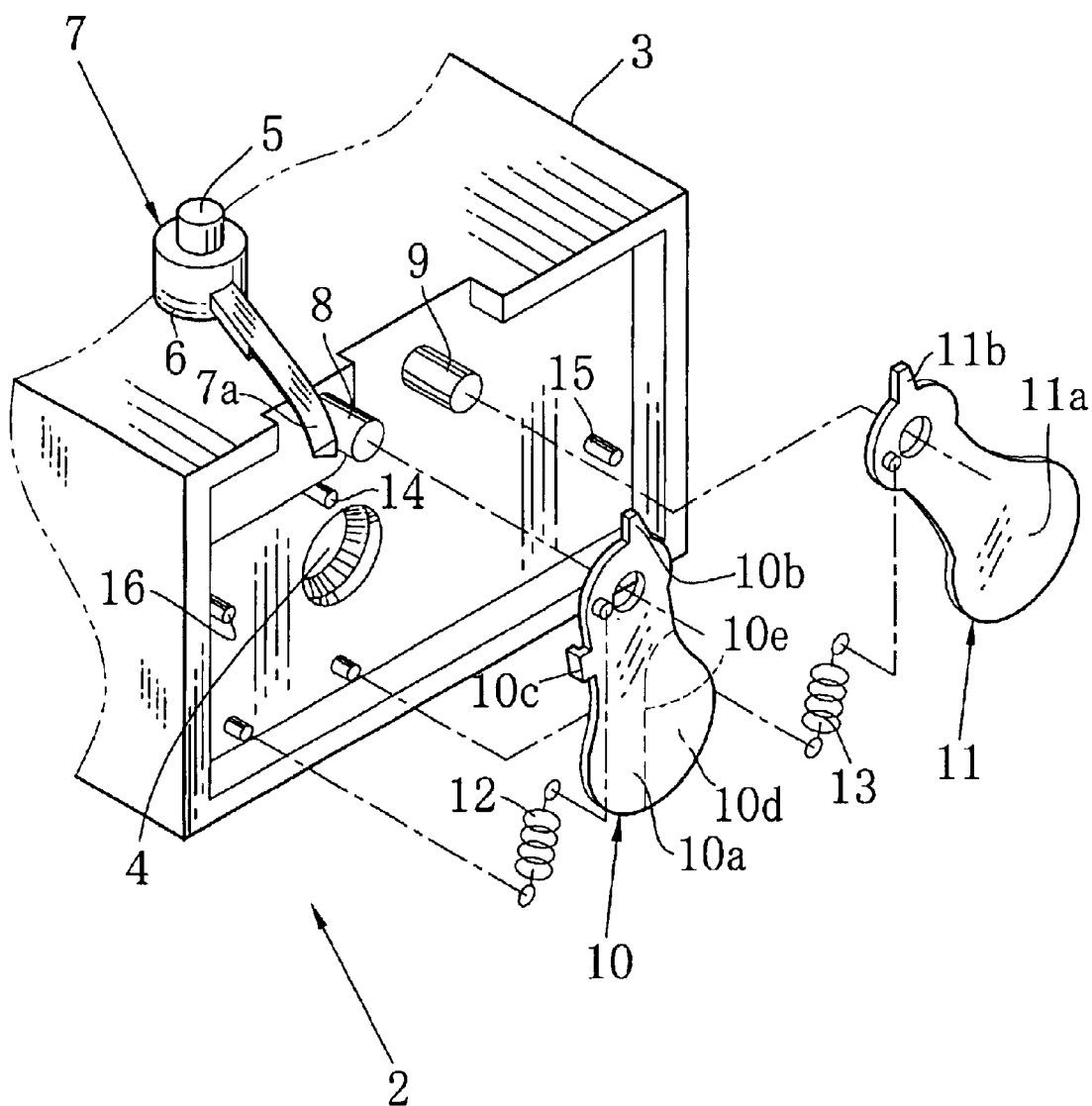
FIG. 2 is a perspective view of an essential part of the shutter device.
Figure 3:
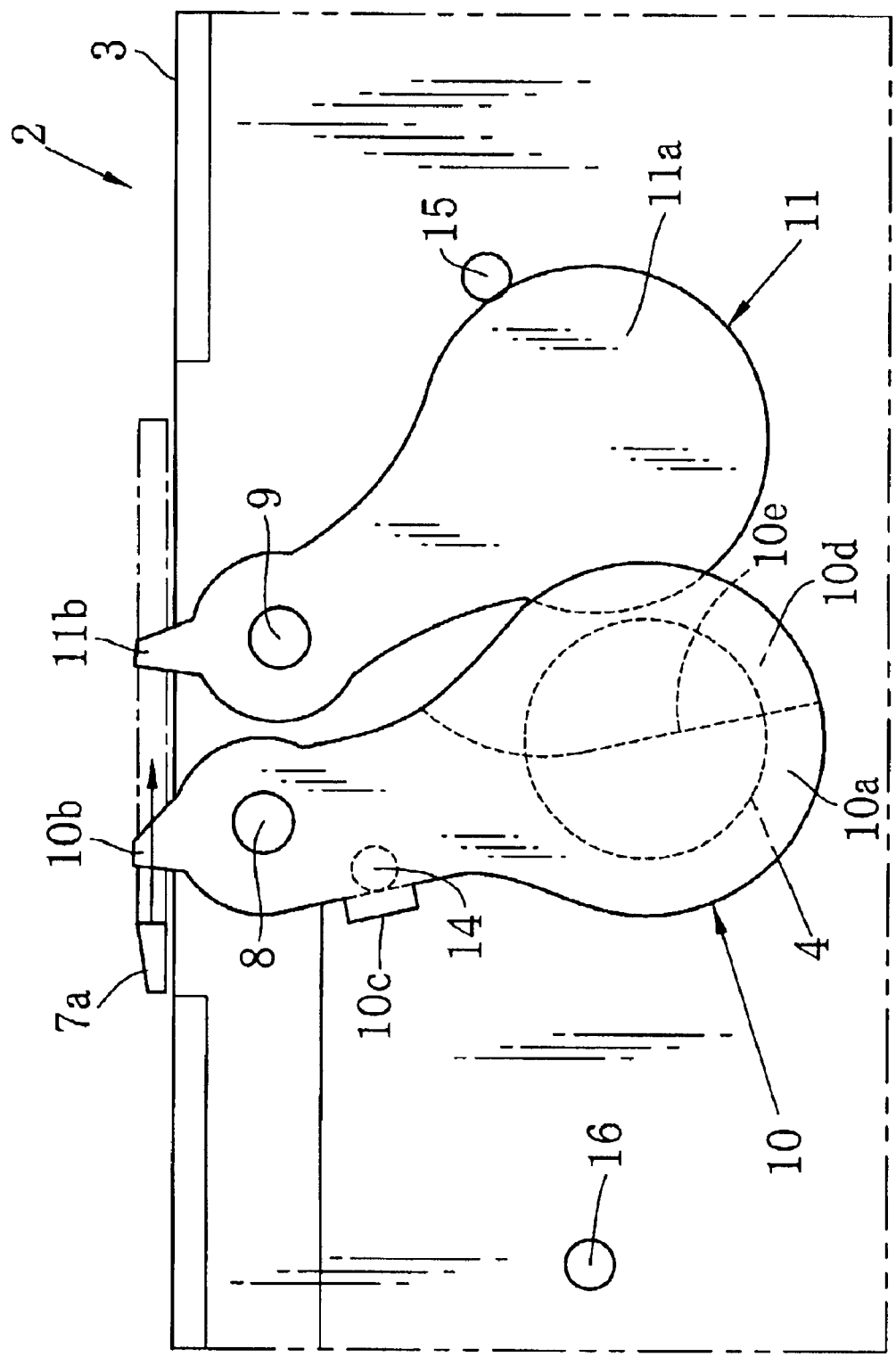
FIG. 3 is a schematic front view of the shutter device shown in FIG. 2.

An essential part of a shutter device of the present invention is shown in FIGS. 2 and 3. In cooperation with shutter release, a shutter device 2 opens and closes an exposure aperture 4 formed in front of a light-shielding pipe 3. The taking lens 21 is located in front of the exposure aperture 4. An exposure frame (not shown) is formed behind the light-shielding pipe 3 to determine an exposure area of the photo film. Moreover, stoppers 14–16 are formed on the front of the light-shielding pipe 3 to limit the movement of a front blade 10 and a rear blade 11, which are described later.

Figure 4:
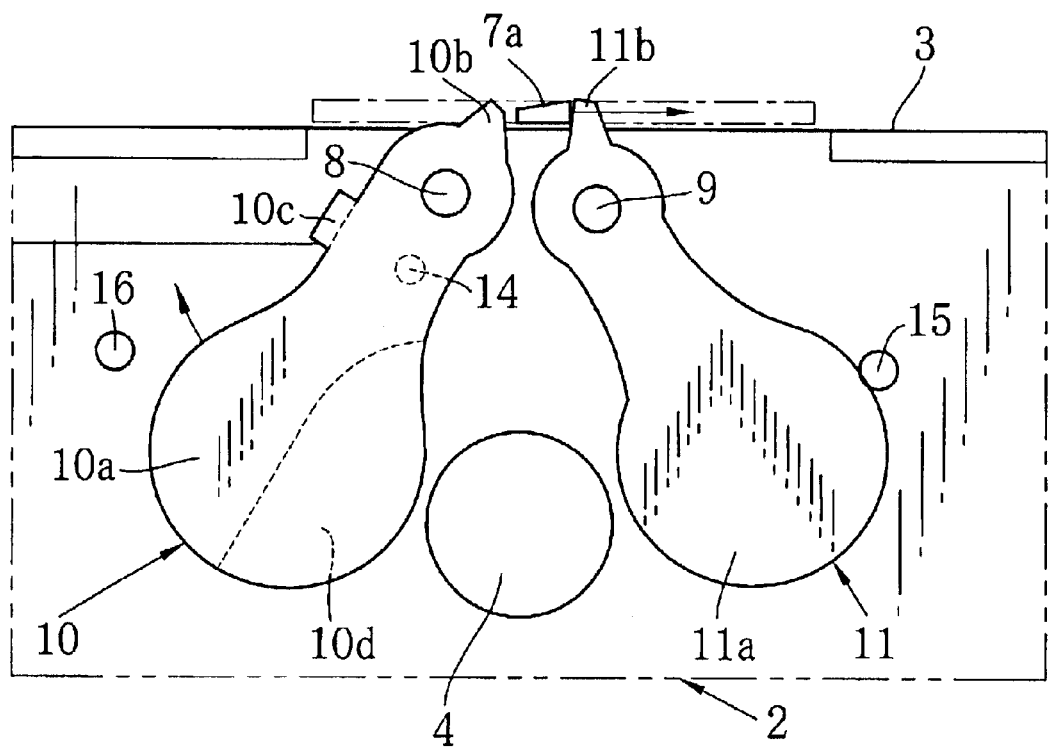
FIG. 4 is a schematic front view of the shutter device in state where an exposure aperture is fully opened.
Figure 5:
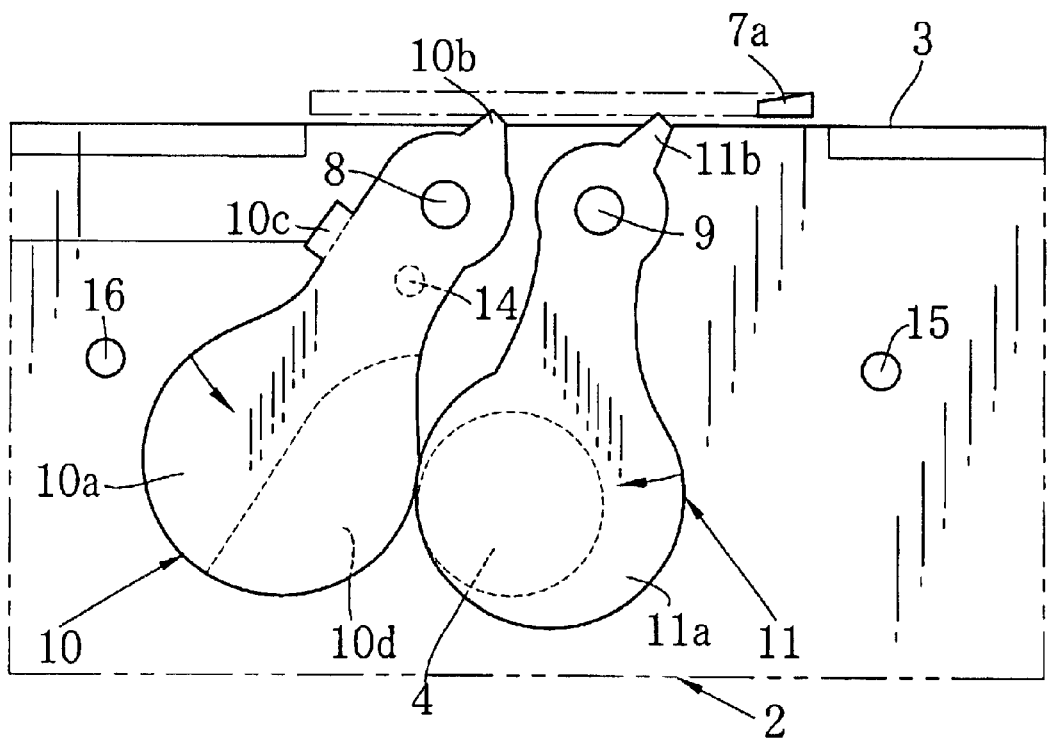
FIG. 5 is a schematic front view of the shutter device in state where an exposure aperture is closed.
Figure 6A:
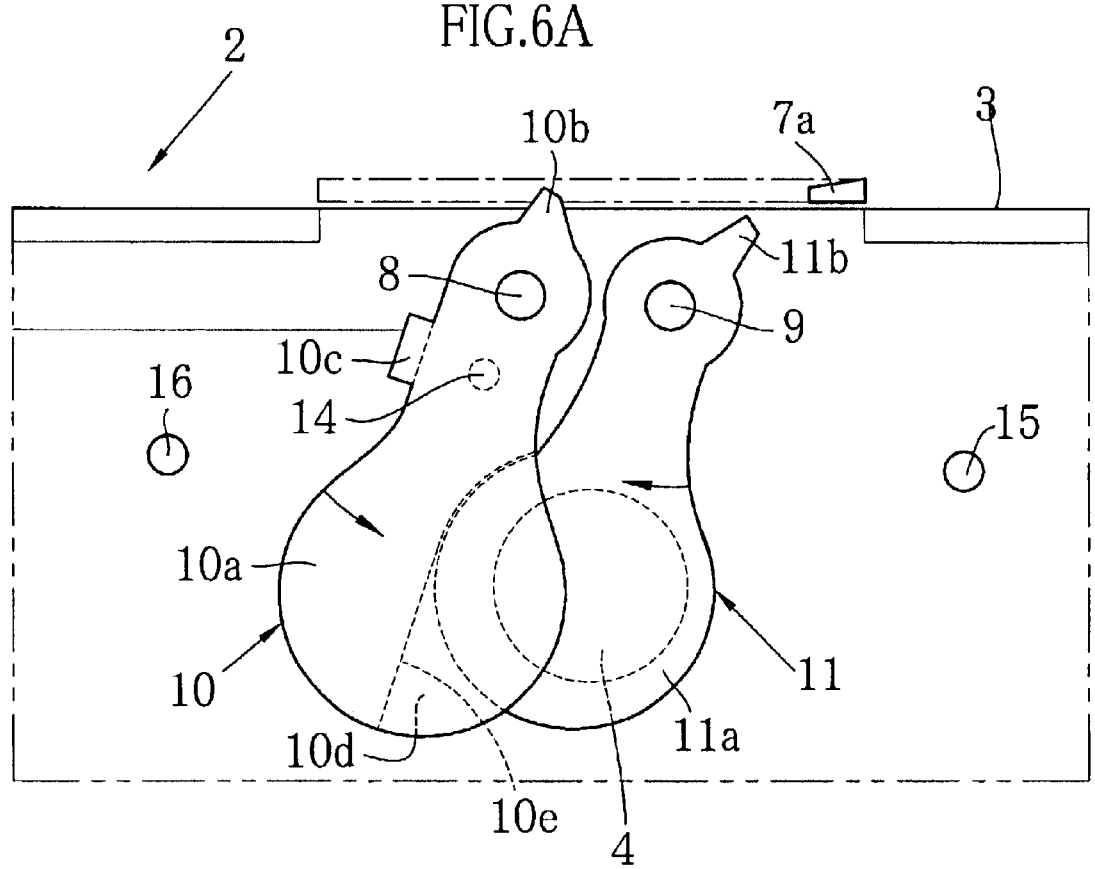
FIG. 6A is a schematic front view of the shutter device in state where a front blade and a rear blade are overlapped.
Figure 6B:
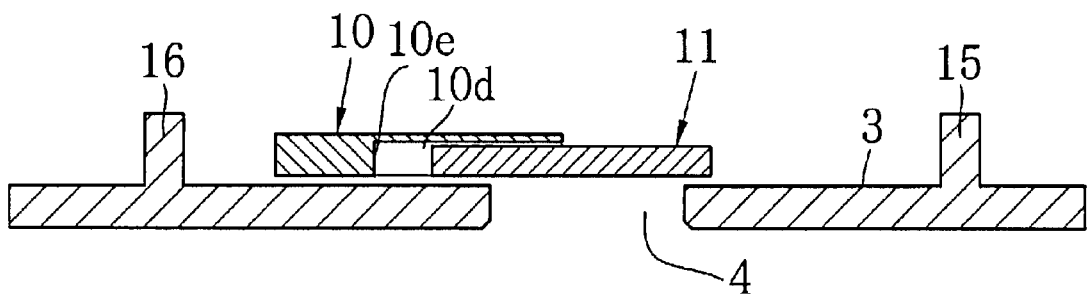
FIG. 6B is a cross section of the shutter device in state where the front blade and the rear blade are overlapped.

The shutter device 2 has a shutter drive lever 7, and the front blade 10 and the rear blade 11 both of which are biased in a clockwise direction by extension springs 12 and 13. The shutter drive lever 7, which is attached rotatable around a shaft 5 provided on the light-shielding pipe 3, is urged by a torsion coil spring 6 in a clockwise direction. The front blade 10 is supported rotatable by a pin 8 provided in front of the light-shielding pipe 3. Normally, the front blade 10 is held by the extension spring 12 at the closed position, in which a stopper receiver 10c comes in contact with the stopper 14, such that a blade section 1a of the front blade 10 closes the exposure aperture 4 completely. A cutout 10d is formed in the rear surface of the blade section 10a, which is faced to the exposure aperture 4. A hollow surface 1e of the blade section 1a forms the boundary between a thick part and a thin part. The rear blade 11 is supported rotatable by a pin 9 provided in front of the light-shielding pipe 3. Normally, the rear blade 11 is held by the extension spring 13 at the open position to open the exposure aperture 4 completely. A blade section 11a contacts the stopper 15 at the open position. Projections 10b and 11b are respectively integrated with the front blade 10 and the rear blade 11, and project upwards from the top edge of the light-shielding pipe 3. The projections 10b and 11b are sequentially struck by an arm 7a of the shutter drive lever 7 when the shutter drive lever 7 moves in the direction shown by the arrow in FIG. 2. When the arm 7a strikes the projection lob, the front blade 10 swings in the clockwise direction to open the exposure aperture 4, and then returns to the closed position by the bias of the extension spring 12. After the front blade 10 is struck, the projection 11b of the rear blade 11 is struck to rotate the rear blade 11 in the clockwise direction. In the rotation, the blade section 11a overlaps with the thin part of the blade section 10a of the front blade 10 via the cutout 10d. Then, the blade section 11a is struck on the hollow surface 10e of the front blade 10, so as to prevent the rotation of the rear blade 11 in the clockwise direction. By the bias of the extension spring 13, the rear blade 11 is returned to the open position. The operation of the above embodiment is described in reference with FIGS. 3 to 6. It is to be noted that the extension springs 12 and 13 are not illustrated in FIGS. 3 to 6 so as to prevent complexity of the drawings. Single chain lines in the drawings show the traveling track of the arm 7a. In FIG. 3, when the shutter drive lever 7 moves in cooperation with shutter release, the arm 7a strikes the projection 10b of the front blade 10 first to move the front blade 10 to expose the exposure aperture 4 completely(see FIG. 4). As soon as the exposure aperture 4 is fully open, the arm 7a strikes the projection 11b of the rear blade 11 to move the rear blade 11 to close the exposure aperture 4 completely. At this moment, the front blade 10 contacts the stopper 16 so that the front blade 10 stops its rotation in the clockwise direction. Then the front blade 10 begins to rotate in the counterclockwise direction by the bias of the extension spring 12, whereas the rear blade 11 rotates in the clockwise direction, as shown in FIG. 5. Before the front blade 10 begins to cover the exposure aperture 4, the front blade 10 and the rear blade 11 are overlapped with each other through the cutout 10d. When overlapped about half of the blade section 10a, the front blade 10 strikes the rear blade 11, as shown in FIGS. 6A and 6B. Owing to this, the rear blade 11 stops its rotation on the clockwise direction. Overlapped with each other, the front and rear blades 10 and 11 rotate back to the primary positions shown in FIG. 3, so that the exposure aperture 4 is not exposed again. The shutter drive lever 7 moves to the release complete position by the bias of the torsion coil spring 6. One exposure is carried out in this way.

As mentioned above, the arm 7a strikes the front blade 10 and the rear blade 11 successively, so that the rear blade 11 starts closing the exposure aperture 4 just after the front blade 10 opens the exposure aperture 4 completely. As the two blades are overlapped with each other to close the exposure aperture 4 without opening again, it is possible to realize higher shutter speed ($\frac{1}{250}$ to $\frac{1}{500}$ second) than the normal shutter speed ($\frac{1}{100}$ to $\frac{1}{150}$ second). Note that it is preferable to overlap each part of the front and rear blades on their return by the bias of the spring. According to the above embodiment, the cutout 10d is formed on the side of the exposure aperture 4 of the front blade 10. However, the cutout may be formed in the other side of the front blade 10 or in the rear blade 11. Furthermore, it is possible not to form the cutout 10d as far as there is enough space to overlap each blade in the direction parallel to the thickness of the front blade 10. In this case, it is possible to prevent the rear blade 11 from opening the exposure aperture 4 by providing a stopper for limiting the rotation of the rear blade 11 in the clockwise direction.

According to the present invention, it is also possible to switch the shutter speed in two grades. As mentioned in the above embodiment, an exposure at a high speed is realized by striking the front blade 10 and the rear blade 11 successively. As shown in FIG. 7, the stopper 19 to hold the rear blade 11 is movable between the position shown by a broken line and the retract position shown by a solid line. When the rear blade 11 is at the retract position, the projection 11b gets out of the running path of the arm 7a so that the rear blade 11 is not struck by the arm 7a.

In case exposure is performed only by the front blade 10, the shutter speed is lengthened into the normal shutter speed ($\frac{1}{100}$ to $\frac{1}{150}$ seconds). For instance, it is possible to change the shutter speed easily by providing an operation member to move the stopper 19. It is also possible to connect the flash operation member 24 mechanically with the stopper 19. In flash photography, the flash operation member 24 is operated to hold the stopper 19 at the retract position, so as to extend the shutter speed. Thereby, it is possible to improve the description of background.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A shutter device for camera that cooperates with shutter release to open an exposure aperture for fixed period, said shutter device comprising:

a first blade to be held at a first position to cover said exposure aperture by a spring;

a second blade to be held at a second position to open said exposure aperture by a spring; and a shutter drive lever that moves in one direction on shutter release and strikes said first blade and said second blade successively, said second blade beginning to close said exposure aperture after said first blade opens said exposure aperture completely, and said first blade and said second blade keeping said aperture closed and returning to said first position and said second position respectively.

2. A shutter device as claimed in claim 1, wherein said first blade returns to said first position with a part of said second blade overlapped.

3. A shutter device as claimed in claim 2, further comprising a stopper for limiting the rotation of said first blade, said first blade being urged by said spring to return to said first position while said second blade moving against bias of said spring.

4. A shutter device for a camera that cooperates with shutter release to open an exposure aperture for fixed period, said shutter device comprising:
   a first blade to be held at a first position to cover said exposure aperture by a spring;
   a second blade to be held at a second position to open said exposure aperture by a spring; and
   a shutter drive lever that moves in one direction on shutter release and strikes said first blade and said second blade successively,
   said second blade beginning to close said exposure aperture after said first blade opens said exposure aperture completely, and said first blade and said second blade keeping said aperture closed and returning to said first position and said second position respectively;
   wherein said first blade returns to said first position with a part of said second blade overlapped;
   wherein said first blade or said second blade partly has a cutout, said first blade and said second blade being overlapped with each other through said cutout.

5. A shutter device as claimed in claim 4, wherein said second blade strikes said first blade while closing said exposure aperture so as to limit its rotational amount.

6. A shutter device as claimed in claim 2, wherein shutter speed is determined within a range of 1/250 to 1/500 second.

7. A shutter device for camera that cooperates with shutter release to open an exposure aperture for fixed period, said shutter device comprising:
   a first blade to be held at a first position to cover said exposure aperture by a spring;
   a second blade to be held at a second position to open said exposure aperture by a spring; and
   a shutter drive lever that moves in one direction on shutter release and strikes said first blade and said second blade successively,
   said second blade beginning to close said exposure aperture after said first blade opens said exposure aperture completely, and said first blade and said second blade keeping said aperture closed and returning to said first position and said second position respectively;
   wherein said second blade is movable to a third position which is out of a moving range of said shutter drive lever, so that when said shutter drive lever moves upon shutter release the shutter drive lever strikes only said first blade when said second blade is at said third position.

8. A shutter device as claimed in claim 7, further comprising a holding member for holding said second blade either at said second position or said third position.

9. A shutter device as claimed in claim 7, wherein shutter speed is determined in a range of 1/100 to 1/150 second when said second blade is at said third position.

10. A shutter device for camera that cooperates with shutter release to open an exposure aperture for fixed period, said shutter device comprising:
    a shutter drive lever that moves in one direction on shutter release;
    a first blade held at a first position to cover said exposure aperture by a spring, and struck by said shutter drive lever;
    a second blade urged by a spring;
    a holding member that can be set to selectively either hold said second blade at a second position to open said exposure aperture or hold said second blade at a third position to open said exposure aperture, the second blade being out of a moving range of said shutter drive lever when the holding member is selectively set to hold the second blade in the third position,
    wherein said shutter drive lever strikes said first blade and said second blade successively when the holding member is set so that said second blade is at said second position, said second blade closing said exposure aperture after said first blade opens said exposure aperture fully, and said first blade and said second blade keeping said exposure aperture closed and returning to said first position and said second position respectively.

11. A shutter device as claimed in claim 10, wherein said first blade returns to said first position with said second blade partly overlapped when said holding member holds said second blade at said second position.

12. A shutter device for camera that cooperates with shutter release to open an exposure aperture for fixed period, said shutter device comprising:
    a shutter drive lever that moves in one direction on shutter release;
    a first blade held at a first position to cover said exposure aperture by a spring, and struck by said shutter drive lever;
    a second blade urged by a spring;
    a holding member for holding said second blade at a second position to open said exposure aperture or a third position to open said exposure aperture and be out of a moving range of said shutter drive lever, said shutter drive lever striking said first blade and said second blade successively when said second blade is at said second position, said second blade closing said exposure aperture after said first blade opens said exposure aperture fully, and said first blade and said second blade keeping said exposure aperture closed and returning to said first position and said second position respectively;
    wherein the shutter speed is determined in a range of 1/250 to 1/500 second when said second blade is at said second position, and the shutter speed is determined in a range of 1/100 to 1/150 second when said second blade is at said third position.

13. A shutter device for camera that cooperates with a shutter release to open an exposure aperture for a fixed period, said shutter device comprising:
    a first blade urged to a first rest position by a first spring force, the first blade covering the exposure aperture while in the first rest position;
    a second blade urged to a second rest position by a second spring force, the second blade not covering the exposure aperture while in the second rest position; and
    a shutter drive member arranged to move upon shutter release to first directly strike said first blade so as to initiate movement of the first blade away from the first rest position and expose the exposure aperture, and then directly strike said second blade so as to initiate movement of the second blade away from the second rest position and cover the exposure aperture.

14. The shutter device of claim 1, wherein the first and second blades and the shutter lever are constructed and arranged so that the second blade begins to move in a direction to close the exposure aperture immediately upon being struck by the shutter drive lever after the first blade opens the exposure aperture completely.

* * * * *